United States Patent
Tsunemiya

[11] Patent Number: 6,052,542
[45] Date of Patent: *Apr. 18, 2000

[54] FILM CARTRIDGE INDICATION CONTROL APPARATUS

[75] Inventor: Takanobu Tsunemiya, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/726,640

[22] Filed: Oct. 7, 1996

[30] Foreign Application Priority Data

Oct. 16, 1995 [JP] Japan ................................ 7-267053

[51] Int. Cl.⁷ .................................................. G03B 19/02
[52] U.S. Cl. ............................................. 396/390; 396/395
[58] Field of Search .................................... 396/281, 284, 396/387, 389, 390, 392, 395, 406, 409, 410

[56] References Cited

U.S. PATENT DOCUMENTS

| | | | |
|---|---|---|---|
| 4,502,770 | 3/1985 | Niwa et al. | 396/409 |
| 4,779,111 | 10/1988 | Ogawa et al. | 396/409 |
| 4,885,599 | 12/1989 | Goto et al. | 396/407 |
| 5,255,034 | 10/1993 | Shimada et al. | 396/406 |
| 5,649,252 | 7/1997 | Takahashi et al. | 396/389 |

FOREIGN PATENT DOCUMENTS

| | | |
|---|---|---|
| 0441655 | 8/1991 | European Pat. Off. . |
| 5165087 | 6/1993 | Japan . |

OTHER PUBLICATIONS

Patent Abstracts of Japan No. JP 01–128055 A, published May 19, 1989.
Patent Abstracts of Japan No. JP 01–131537 A, published May 24, 1989.
Patent Abstracts of Japan No. JP 02–282735 A, published Nov. 20, 1990.

*Primary Examiner*—Safet Metjahic
*Assistant Examiner*—J. K. Han
*Attorney, Agent, or Firm*—Robin, Blecker & Daley

[57] ABSTRACT

An apparatus adapted to a film cartridge in which a film is contained, comprises an operation device which is operable for arbitrarily rewinding the film into the film cartridge before the film is wholly used, an indication device for causing the film cartridge to provide an indication that the film is partly used upon a film rewinding operation of the operation device and a determination device for determining whether a predetermined transporting action of the film is performed. The indication device causes the film cartridge to provide the indication that the film is wholly used, if the determination device determines that the predetermined transporting action of the film is not performed and the film has been rewound.

38 Claims, 3 Drawing Sheets

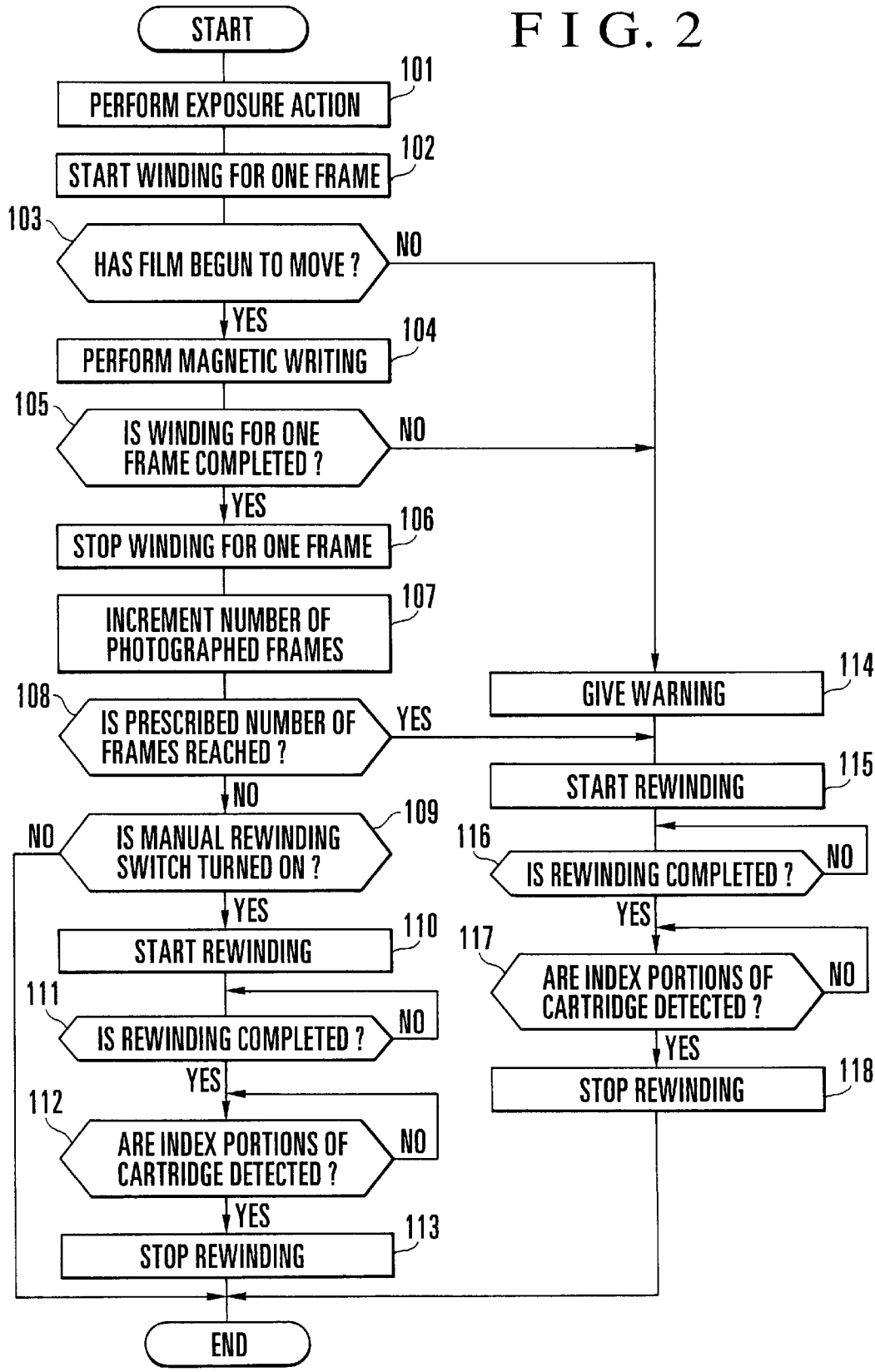

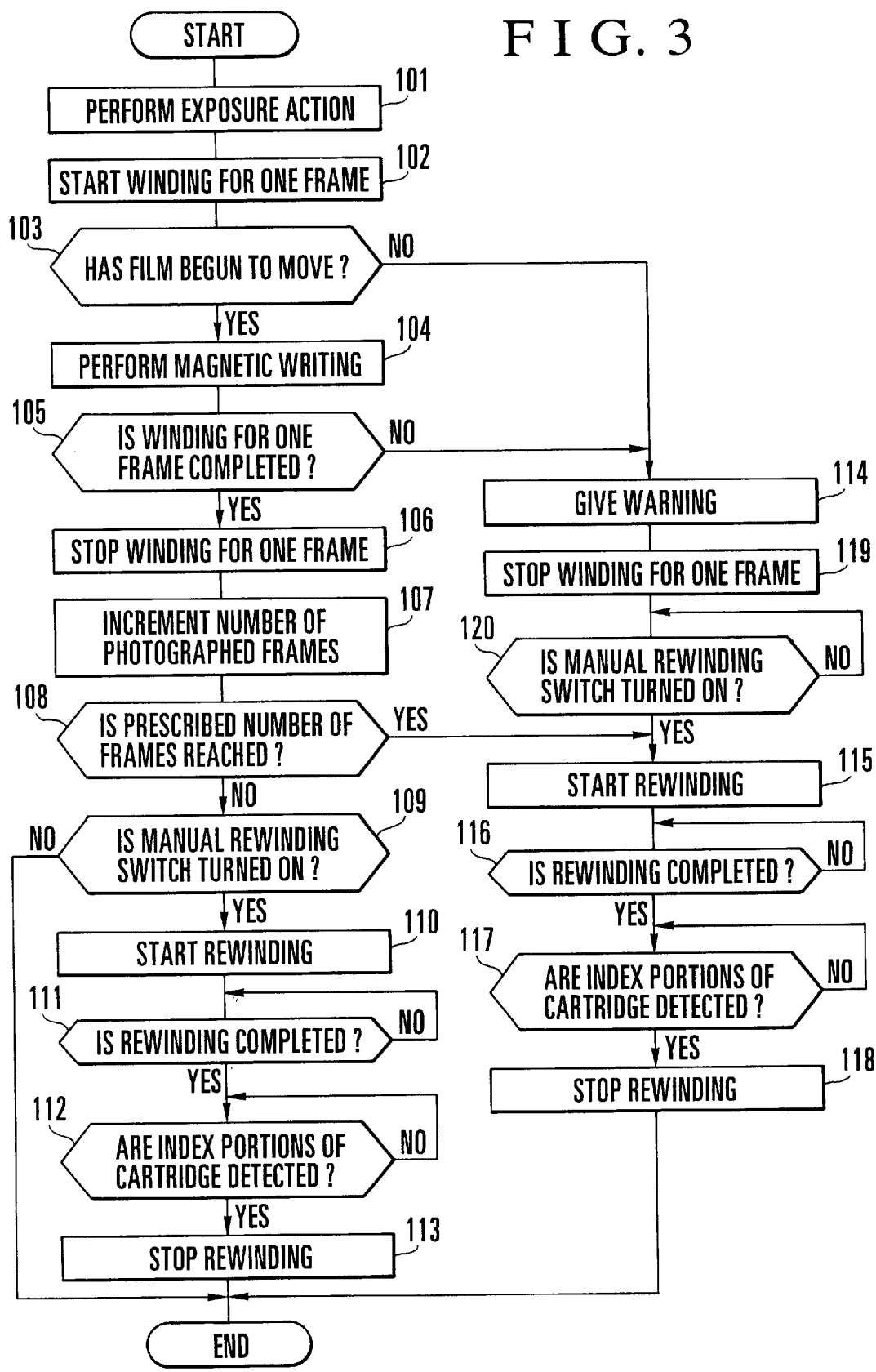

FILM CARTRIDGE INDICATION CONTROL APPARATUS

BACKGROUND OF THE INVENTION

1. Field of the Invention

This invention relates to an improvement of an apparatus, such as a camera, adapted to a film cartridge which has an index indicating a state of use of a film contained in the film cartridge.

2. Description of Related Art

Recently, there has been proposed a camera configured such that, after a film in a halfway used state is rewound into a film cartridge and the film cartridge is taken out from the camera, when the film cartridge is again loaded in the camera, the film is automatically transported up to an unused frame portion thereof so that the film can be used for photography from the unused frame portion thereof.

A film to be loaded in such a kind of camera has a magnetic recording part, so that the camera has the ability to record and read data on and from the magnetic recording part so as to determine a halfway rewinding position of the film from which the film has been rewound without being completely used. A film cartridge containing such a film therein is provided with an index which externally indicates a state of use of the film, such as an "unused", "partially used" or "wholly used" state of the film. The camera is configured to be capable of setting the index to an indication corresponding to an applicable state of use of the film, at the time of rewinding the film. When being loaded with the film cartridge, the camera determines the state of use of the film on the basis of the indication of the index. In a case where the index indicates the "unused" state of the film as the film has not been used at all, the camera causes the film to be transported in blank up to a first frame position thereof to make preparation for photography. In a case where the index indicates the "partially used" state of the film as the film has been rewound from the halfway portion without being completely used, the camera causes the film to be transported in blank to an unused frame portion of the film in such a way as to allow photography to be resumed automatically from the unused frame portion of the film. In a case where the index indicates the "wholly used" state of the film as the film has been completely used for photography, the camera inhibits any photographing operation thereon.

However, in such a kind of camera, in a case where the film has been rewound from the halfway portion because the film has been made unable to be advanced any further due to an accident such as entanglement of the film at the halfway portion, if the film is to be used again with the index being set to an indication indicating the "partially used" state, a photographing operation would not be able to be performed normally since there is a possibility that the film cartridge or film is out of order, or a double exposure would be made on the already exposed frame since the halfway rewinding position has not been normally recorded on the magnetic recording part so as to accurately index an unused frame portion of the film.

BRIEF SUMMARY OF THE INVENTION

In accordance with one aspect of this invention, there is provided an apparatus, such as a camera, comprising operation means operable for arbitrarily rewinding a film into a film cartridge before the film is completely used, indication means for causing the film cartridge to provide an indication that the film is reusable, if the film has been rewound in accordance with an operation of the operation means, determination means for determining an abnormality of a transporting action of the film, and restraining means for restraining the indication means from causing the film cartridge to provide the indication that the film is reusable, if the film has been rewound in accordance with the determination means having determined the abnormality of the transporting action of the film before the film is completely used, so that a partially used film can be used without the possibility of occurrence of any inconveniences when the partially used film is reused for further photographing by the apparatus.

The above and other aspects and features of this invention will become apparent from the following detailed description of embodiments thereof taken in connection with the accompanying drawings.

BRIEF DESCRIPTION OF THE SEVERAL VIEWS OF THE DRAWING

FIG. 2 is a flow chart showing an operation of a microcomputer which is shown in FIG. 1.

FIG. 3 is a flow chart showing an operation of the microcomputer shown in FIG. 1 according to another embodiment of this invention.

DETAILED DESCRIPTION OF THE INVENTION

Figure 1:
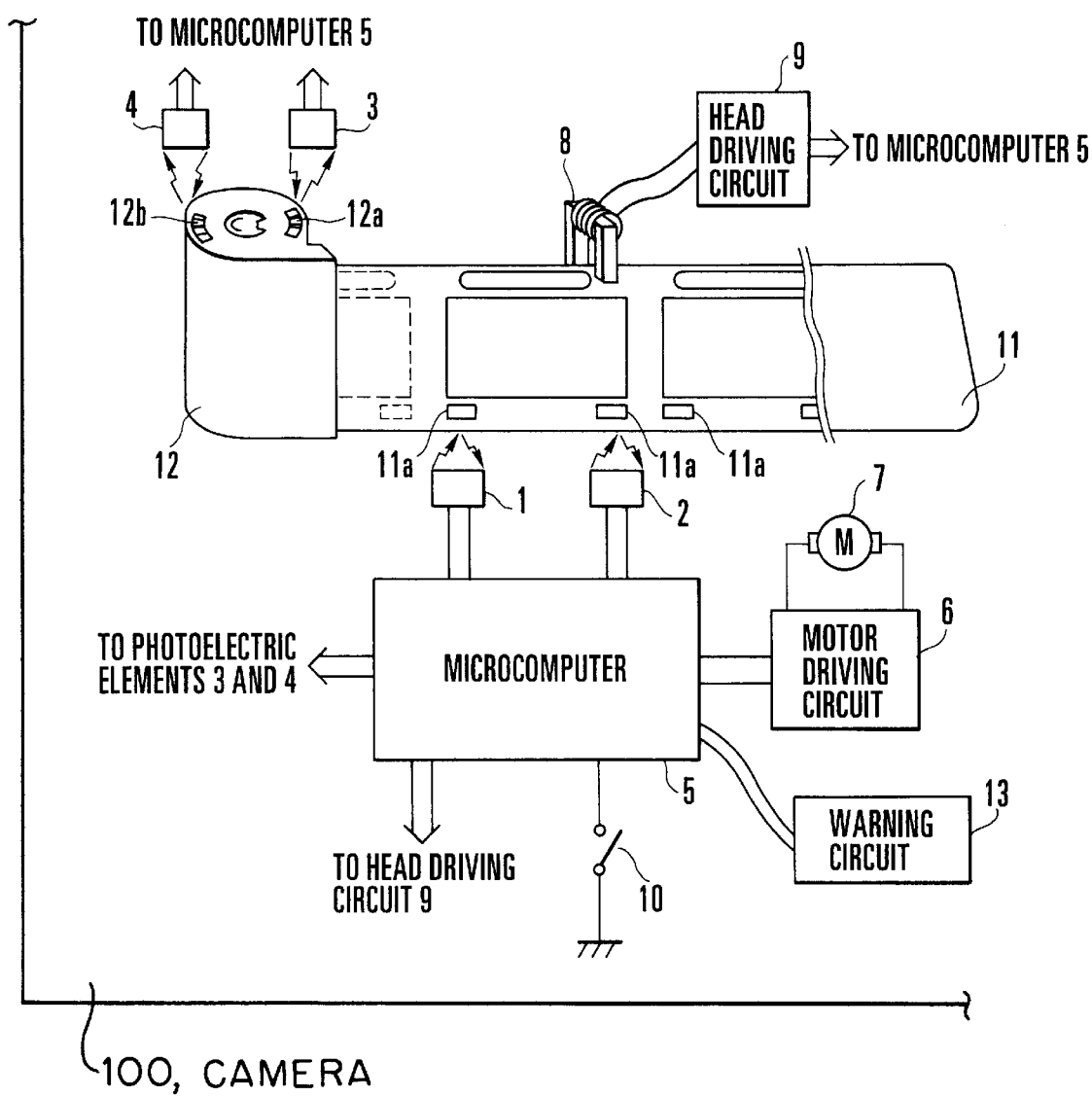
FIG. 1 is a block diagram showing in outline the arrangement of a camera according to an embodiment of this invention.

Preferred embodiments of this invention will be described in the following with reference to the drawings.

FIG. 1 is a block diagram showing in outline the arrangement of a camera, according to an embodiment of this invention, capable of magnetically recording and reading data.

Referring to FIG. 1, a photographic film 11 is provided with a magnetic recording part at each of frame portions. A film cartridge 12 contains the film 11 therein and is provided with index portions 12a and 12b for externally indicating a state of use of the film 11, such as an "unused", "partially used" or "wholly used" state of the film 11. The index portions 12a and 12b are disposed to rotate integrally with a film winding spool which is disposed inside the film cartridge 12 and are arranged to indicate a state of use of the film 11 by the positions where they are stopped. The index portions 12a and 12b indicate also the prescribed number of frames and the ISO sensitivity value of the film 11.

Photoelectric elements (photoreflectors) 1 and 2 serve as film position detecting means for detecting the moving position of the film 11 by sensing perforations 11a provided in the film 11. The moving position of the film 11 can be accurately indexed according to signals of the two photoelectric elements 1 and 2. Photoelectric elements (photoreflectors) 3 and 4 serve as reading means for reading the contents of an indication provided by the index portions 12a and 12b of the film cartridge 12. A state of use of the film 11 is read out from signals of the two photoelectric elements 3 and 4, so that it is determined whether or not the film 11 is usable when the film cartridge 12 is loaded into the camera, or the setting of an indication for the state of use of the film 11 at the time of rewinding the film 11 is indexed.

The photoelectric elements 3 and 4 are used also for reading the prescribed number of frames and the ISO sensitivity value of the film 11. A microcomputer 5 is arranged to control the whole camera and has various functions to cause a motor and a magnetic head to be driven, to process the signals of the photoelectric elements and to detect the states of switches. A motor driving circuit 6 is arranged to drive a film transport motor 7 which is arranged to wind and rewind the film 11. A magnetic head 8 is arranged to magnetically record and read data. A head driving circuit 9 is arranged to drive the magnetic head 8. A manual rewinding switch 10 is arranged to permit an arbitrary rewinding operation on the film 11 to arbitrarily rewind the film back into the film cartridge. A warning circuit 13 is arranged to give a warning in the event of occurrence of such an abnormality that the film 11 has become unable to be advanced any further in a halfway portion of the film 11.

The operation of the above-stated arrangement is described below with reference to FIG. 2 which is a flow chart showing a flow of operation of the microcomputer 5.

At a step 101, an exposure action is performed. At a step 102, the motor driving circuit 6 is caused to energize the film transport motor 7 in such a direction as to wind the film 11, so that the motor 7 begins to perform a winding action for one frame of the film 11. At a step 103, a check is made through the photoelectric elements 1 and 2 to find if the film 11 has actually begun to move. If so, the flow of operation proceeds to a step 104. At the step 104, the magnetic head 8 is caused, through the head driving circuit 9, to write information of varied kinds, such as a photographing date, etc., into the magnetic recording part of the film 11. The magnetic recording action of the magnetic head 8 is of course performed according to the moving speed of the film 11.

At a step 105, a check is made for the position of the film 11, again through the photoelectric elements 1 and 2, to find if the winding action for one frame of the film 11 has been completed. If so, the flow proceeds to a step 106. At the step 106, the winding action for one frame of the film 11 is terminated by bringing the rotation of the film transport motor 7 to a stop.

At a step 107, the number of photographed frames counted is incremented by one. At a step 108, the prescribed number of frames, which is read out from the index portions 12a and 12b of the film cartridge 12 by the photoelectric elements 3 and 4, and the number of photographed frames are compared with each other. If the number of photographed frames is found not to have reached the prescribed number of frames and the film 11 is decided to be usable for further photographing, the flow proceeds to a step 109. At the step 109, a check is made to find if the manual rewinding switch 10 is turned on by a manual operation. If not, the flow of operation is brought to an end.

If the manual rewinding switch 10 is found to be in an on-state at the step 109, the flow proceeds to a step 110 as the on-state of the manual rewinding switch 10 indicates an instruction for the halfway film rewinding. At the step 110, the motor driving circuit 6 is caused to start driving the film transport motor 7 in such a direction as to rewind the film 11. At a step 111, a check is made through the photoelectric elements 1 and 2 to find if the rewinding action of the film 11 has been completed. If so, the flow proceeds to a step 112. At the step 112, a check is made through the photoelectric elements 3 and 4 to find if an indication provided by the index portions 12a and 12b of the film cartridge 12 indicating the state of use of the film 11 has become a state indicating a "partially used" state. If so, the flow proceeds to a step 113. At the step 113, the rotation of the film transport motor 7 is brought to a stop, and the flow of operation comes to an end.

On the other hand, if no movement of the film 11 is detected at the step 103 or 105, such an event that the film 11 is unable to be advanced due to some accident or malfunction is considered to have occurred, since the film 11 is not moving despite the fact that the film transport motor 7 is being driven. In that event, the flow proceeds to a step 114. At the step 114, the warning circuit 13 is caused to give a warning to the operator of the camera concerning the accident. Then, at a step 115, the motor driving circuit 6 is caused to start driving the film transport motor 7 in such a direction as to rewind the film 11. At a step 116, a check is made through the photoelectric elements 1 and 2 to find if the rewinding action of the film 11 has been completed. If so, the flow proceeds to a step 117. At the step 117, a check is made through the photoelectric elements 3 and 4 to find if an indication provided by the index portions 12a and 12b of the film cartridge 12 indicating the state of use of the film 11 has become a state indicating a "wholly used" state. If so, the flow proceeds to a step 118. At the step 118, the film transport motor 7 is brought to a stop, and the flow of operation comes to an end.

In this instance, the indication provided by the index portions 12a and 12b of the film cartridge 12 indicating the state of use of the film 11 is made to be set as the indication of the "wholly used" state instead of the indication of the "partially used" state, despite the fact that the film has been rewound from a halfway portion thereof. The reason for this is as follows. In a case where the film 11 has been rewound from the halfway portion because the film 11 has been made unable to be advanced any further, a photographing operation would not be able to be performed normally when the film 11 is intended to be reused since there is a possibility that the film cartridge 12 or film 11 is out of order, or a double exposure would be made on the already exposed frame since the halfway rewinding position has not been normally recorded on the magnetic recording part so as to accurately index an unused frame portion of the film. Therefore, the indication provided by the index portions 12a and 12b of the film cartridge 12 is made to be the indication of the "wholly used" state, so that the film 11 can be prevented from being reused, thereby eliminating the above-mentioned inconveniences.

Further, if the number of photographed frames is found to have reached the prescribed number of frames at the step 108, it indicates that the film 11 has been wholly used. The flow then proceeds to the step 115 to cause the motor driving circuit 6 to start driving the film transport motor 7 in such a direction as to rewind the film 11. With completion of the film rewinding action detected at the step 116, a check is made at the step 117 to find if an indication provided by the index portions 12a and 12b of the film cartridge 12 has become a state indicating the "wholly used" state. If so, the flow proceeds to the step 118 to bring the film transport motor 7 to a stop, and the flow of operation comes to an end.

In this instance, since the film 11 is rewound after having been completely used, the indication provided by the index portions 12a and 12b of the film cartridge 12 is made to indicate the "wholly used" state without executing the step 114 which is provided for giving a warning, and the flow of operation is terminated.

FIG. 3 is a flow chart showing an operation of the microcomputer 5 shown in FIG. 1 according to a second embodiment of this invention.

The second embodiment differs from the first embodiment described in the foregoing in the following point. In the first embodiment, after the film 11 happens to become unable to be advanced due to some abnormality, a warning is given at the step 114 in FIG. 2 and then the flow of operation immediately proceeds to the step 115 to rewind the film 11. In the second embodiment, on the other hand, after the film 11 happens to become unable to be advanced due to some abnormality and, then, a warning is given at the step 114 in FIG. 3, the flow of operation proceeds to a step 119 before a rewinding action of the film 11 begins at the step 115. At the step 119, the film transport motor 7 is brought to a stop to terminate the winding action for one frame. At the next step 120, the flow waits for turning-on of the manual rewinding switch 10 before proceeding to the step 115.

With the exception of the above stated point, the second embodiment is configured in the same manner as the first embodiment. In FIG. 3, all steps of processes which are the same as those of FIG. 2 are indicated by the same step numbers and a description of the details of these steps is omitted.

In the case of the second embodiment, as described above, the film rewinding action of the film 11 is not allowed to begin before the manual rewinding switch 10 is turned on. This arrangement not only gives a warning but also enables the operator of the camera to recognize the warning and to initiate the film rewinding action by operating the manual rewinding switch 10. The operator is thus enabled to accurately grasp the situation and to firmly know that the film cartridge is not usable for further photographing.

The individual components shown in schematic or block form in the drawings are all well known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, each of the above-described embodiments is arranged to cause the index portions of the film cartridge to provide the indication of a "wholly used" state when the film has been rewound from a halfway portion thereof due to occurrence of some abnormality that prevents the film from being advanced for one-frame. The arrangement according to this invention likewise applies to the blank advance of the film in loading the film or to other film transporting actions. The arrangement according to this invention also applies to abnormalities other than troubles in respect of the film transport. Further, this invention is not limited to the described manner of providing the indication of the "wholly used" state. This indication may be replaced with any other suitable indication, such as an indication made by adding some wording to the words "partially used" or with some mechanical or magnetic indication.

In accordance with this invention, a warning to be given when the film has been rewound from a halfway portion thereof due to some abnormality in respect of the film transport may be given by means of light, sound or something else. Further, such a warning may be omitted.

This invention is not limited to the apparatus arranged to magnetically record and read information on and from a film. This invention is applicable also to an apparatus arranged to record and read information in an optical manner or in any manner other than magnetic recording or reading.

In the case of the embodiment shown in FIG. 3, after the film transport action is brought to a stop due to the occurrence of an abnormality preventing the film transport action, a film rewinding operation is arranged to be performed by the manual rewinding switch in the same manner as in a normal film rewinding operation. However, the arrangement may be changed to carry out the film rewinding by some predetermined operation other than the normal film rewinding operation.

The software arrangement and the hardware arrangement in each of the above-described embodiments are interchangeable with each other as desired.

This invention may be carried out by combining as necessary the embodiments, their modifications or their technological elements described in the foregoing.

Further, this invention is applicable to cameras of various kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. An apparatus adapted to a film cartridge capable of indicating a use state of a film of the film cartridge, said apparatus comprising:

a film transporting device;

a recording device that records information on a film during a predetermined transporting action of the film; and a control device that causes the film cartridge to provide a predetermined film partially used indication, if the predetermined transporting action of the film is performed by said film transporting device and the film is rewound into the film cartridge in a state where the film has been partially used, said control device causing the film cartridge to provide a predetermined film wholly used indication, if the predetermined transporting action of the film is not performed and the film is rewound into the film cartridge in the state where the film has been partially used.

2. An apparatus according to claim 1, wherein said film transporting device performs a predetermined automatic film transportation as the predetermined transporting action of the film.

3. An apparatus according to claim 1, wherein said film transporting device performs an automatic film one frame transportation after photographing as the predetermined transporting action of the film.

4. An apparatus according to claim 1, wherein said control device determines whether the predetermined transporting action of the film is performed.

5. An apparatus according to claim 4, wherein said control device automatically starts to rewind the film into the film cartridge if said control device determines that the predetermined transporting action of the film is not performed.

6. An apparatus according to claim 4, wherein said control device stops the predetermined transporting action of the film if said control device determines that the predetermined transporting action of the film is not performed, and then starts to rewind the film into the film cartridge in accordance with a predetermined operation.

7. An apparatus according to claim 4, further comprising:

a warning device that gives a warning if said control device determines that the predetermined transporting action of the film is not performed.

8. An apparatus according to claim 4, further comprising:
an operation device for arbitrarily starting to rewind the film into the film cartridge in a state where said predetermined transporting action of the film is performed,
wherein said control device stops the predetermined transporting action of the film if said control device determines that the predetermined transporting action of the film is not performed, and then starts to rewind the film into the film cartridge by using said operation device.

9. An apparatus according to claim 1, further comprising:
an operation device for arbitrarily starting to rewind the film into the film cartridge in a state where said predetermined transporting action of the film is performed.

10. An apparatus according to claim 1, wherein a recording device records magnetic information on the film during the predetermined transporting action of the film.

11. An apparatus according to claim 1, wherein said apparatus comprises a camera.

12. An apparatus according to claim 1, wherein said apparatus comprises an apparatus for a camera.

13. A unit adapted to an apparatus that uses a film cartridge capable of indicating a use state of a film of the film cartridge and records information on the film during a predetermined transporting action of the film, said unit comprising:
a control device that causes a film cartridge to provide a predetermined film partially used indication, if the predetermined transporting action of the film is performed and the film is rewound into the film cartridge in a state where the film has been partially used, said control device causing the film cartridge to provide a predetermined film wholly used indication, if the predetermined transporting action of the film is not performed and the film is rewound into the film cartridge in a state where the film has been partially used.

14. A unit according to claim 13, wherein the predetermined transporting action of the film comprises an automatic film one frame transportation after photographing.

15. A unit according to claim 13, wherein said unit comprises a unit for a camera.

16. An apparatus adapted to a film cartridge capable of indicating a use state of a film of the film cartridge, said apparatus comprising:
a film transporting device;
a recording device that records information on the film during a predetermined transporting action of the film; and
a control device that causes the film cartridge to provide a predetermined film partially used indication, if the predetermined transporting action of the film is performed by said film transporting device and the film is rewound into the film cartridge in a state where the film has been partially used, said control device causing the film cartridge not to provide the predetermined film partially used indication, if the predetermined transporting action of the film is not performed and the film is rewound into the film cartridge in the state where the film has been partially used.

17. An apparatus according to claim 16, wherein said film transporting device performs a predetermined automatic film transportation as the predetermined transporting action of the film.

18. An apparatus according to claim 16, wherein said film transporting device performs an automatic film one frame transportation as the predetermined transporting action of the film.

19. An apparatus according to claim 16, wherein said control device determines whether the predetermined transporting action of the film is performed.

20. An apparatus according to claim 19, wherein said control device automatically starts to rewind the film into the film cartridge if said control device determines that the predetermined transporting action of the film is not performed.

21. An apparatus according to claim 19, wherein said control device stops the predetermined transporting action of the film if said control device determines that the predetermined transporting action of the film is not performed, an then starts to rewind the film into the film cartridge in accordance with a predetermined operation.

22. An apparatus according to claim 19, further comprising:
a warning device that gives a warning if said control device determines that the predetermined transporting action of the film is not performed.

23. An apparatus according to claim 19, further comprising:
an operation device for arbitrarily starting to rewind the film into the film cartridge in a state where said predetermined transporting action of the film is performed,
wherein said control device stops the predetermined transporting action of the film if said control device determines that the predetermined transporting action of the film is not performed, and then starts to rewind the film into the film cartridge by using said operation device.

24. An apparatus according to claim 16, further comprising
an operation device for arbitrarily starting to rewind the film into the film cartridge in a state where said predetermined transporting action of the film is performed.

25. An apparatus according to claim 16, wherein a recording device records magnetic information on the film during the predetermined transporting action of the film.

26. An apparatus according to claim 16, wherein said apparatus comprises a camera.

27. An apparatus according to claim 16, wherein said apparatus comprises an apparatus for a camera.

28. A unit adapted to an apparatus that uses a film cartridge capable of indicating a use state of a film of the film cartridge and records information on the film during a predetermined transporting action of the film, said apparatus comprising:
a control device that causes a film cartridge to provide a predetermined film partially used indication, if the predetermined transporting action of the film is performed and the film is rewound into the film cartridge in a state where the film has been partially used, said control device causing the film cartridge not to provide the predetermined film partially used indication, if the predetermined transporting action of the film is not performed and the film is rewound into the film cartridge in the state where the film has been partially used.

29. A unit according to claim 28, wherein the predetermined transporting action of the film comprises an automatic film one frame transportation.

30. A unit according to claim 28, wherein said unit comprises an apparatus for a camera.

31. An apparatus adapted to an image recording medium cartridge capable of indicating a use state of an image recording medium of the image recording medium cartridge, said apparatus comprising:

an image recording medium transporting device, and a control device that causes the image recording medium cartridge to provide a predetermined image recording medium partially used indication, if a predetermined transporting action of the image recording medium is performed by said image recording medium transporting device and the image recording medium is rewound into the image recording medium cartridge in a state where the image recording medium has been partially used, said control device causing the image recording medium cartridge not to provide the predetermined image recording medium partially used indication, if the predetermined transporting action of the image recording medium is not performed and the image recording medium is rewound into the image recording medium cartridge in the state where the image recording medium has been partially used.

32. An apparatus according to claim 31, wherein said apparatus comprises a camera.

33. A unit adapted to an apparatus that uses an image recording medium cartridge capable of indicating a use state of an image recording medium of the image recording medium cartridge and records information on the image recording medium during a predetermined transporting action of the image recording medium, said unit comprising:

a control device that causes an image recording medium cartridge to provide a predetermined image recording medium partially used indication, if the predetermined transporting action of an image recording medium is performed and the image recording medium is rewound into the image recording medium cartridge in a state where the image recording medium has been partially used, said control device causing the image recording medium cartridge not to provide the predetermined image recording medium partially used indication, if the predetermined transporting action of the image recording medium is not performed and the image recording medium is rewound into the image recording medium cartridge in the state where the image recording medium has been partially used.

34. A unit according to claim 33, wherein said unit comprises an apparatus for a camera.

35. An apparatus adapted to an image recording medium cartridge capable of indicating a use state of an image recording medium of the image recording medium cartridge, said apparatus comprising:

an image recording medium transporting device, and a control device that causes the image recording medium cartridge to provide a predetermined image recording medium partially used indication, if a predetermined transporting action of the image recording medium is performed by said image recording medium transporting device and the image recording medium is rewound into the image recording medium cartridge in a state where the image recording medium has been partially used, said control device causing the image recording medium cartridge to provide a predetermined image recording medium wholly used indication, if the predetermined transporting action of the image recording medium is not performed and the image recording medium is rewound into the image recording medium cartridge in the state where the image recording medium has been partially used.

36. An apparatus according to claim 35, wherein said apparatus comprises a camera.

37. A unit adapted to an apparatus that uses an image recording medium cartridge capable of indicating a use state of an image recording medium of the image recording medium cartridge and records information on the image recording medium during a predetermined transporting action of the image recording medium, said unit comprising:

a control device that causes an image recording medium cartridge to provide a predetermined image recording medium partially used indication, if the predetermined transporting action of the image recording medium is performed and the image recording medium is rewound into the image recording medium cartridge in a state where the image recording medium has been partially used, said control device causing the image recording medium cartridge to provide a predetermined image recording medium wholly used indication, if the predetermined transporting action of the image recording medium is not performed and the image recording medium is rewound into the image recording medium cartridge in the state where the image recording medium has been partially used.

38. A unit according to claim 37, wherein said unit comprises a unit for a camera.

* * * * *